United States Patent [19]

Vetter et al.

[11] 4,153,663
[45] May 8, 1979

[54] METHODS FOR BENDING STRETCHED SYNTHETIC RESIN SHEETS

[75] Inventors: Heinz Vetter, Darmstadt-Arheilgen; Ernst Friedrich, Darmstadt, both of Fed. Rep. of Germany

[73] Assignee: Rohm GmbH, Darmstadt, Fed. Rep. of Germany

[21] Appl. No.: 709,079

[22] Filed: Jul. 27, 1976

[30] Foreign Application Priority Data

Aug. 8, 1975 [DE] Fed. Rep. of Germany ....... 2535444

[51] Int. Cl.$^2$ ............................................. B29C 17/02
[52] U.S. Cl. .................................... 264/286; 264/230
[58] Field of Search .............. 264/230, 285, 286, 287, 264/292, 342, 339

[56] References Cited

U.S. PATENT DOCUMENTS

| | | | |
|---|---|---|---|
| 2,660,761 | 12/1953 | Peters | 264/292 X |
| 3,000,057 | 9/1961 | Swedlow | 264/230 |
| 3,077,040 | 2/1963 | Steiber | 264/230 |
| 3,414,181 | 12/1968 | Sloan | 264/230 X |
| 3,546,754 | 12/1970 | Erb | 264/230 X |
| 3,661,694 | 5/1972 | Bequet | 264/286 X |
| 3,684,642 | 8/1972 | Rogers | 264/286 X |
| 3,751,328 | 8/1973 | Roberts | 264/286 X |
| 3,885,015 | 5/1975 | Ono et al. | 264/230 |
| 3,984,517 | 10/1976 | Bequet | 264/230 |

Primary Examiner—James B. Lowe
Attorney, Agent, or Firm—Curtis, Morris & Safford

[57] ABSTRACT

Methods and apparatus are disclosed for bending monoaxially or bi-axially stretched sheets of a thermoplastically deformable synthetic resin by heating one side of the sheet above the softening temperature of the resin while the temperature on the other side is beneath the softening temperature, whereupon the resin sheet bends by itself or can be bent with forming tools.

4 Claims, 3 Drawing Figures

METHODS FOR BENDING STRETCHED SYNTHETIC RESIN SHEETS

The present invention relates to methods and apparatus for bending stretched synthetic resin sheets.

Sheets of stretched thermoelastically deformable synthetic resins are distinguishable from sheets of the same, but unstretched, synthetic resin by increased mechanical strength and by decreased susceptibility to stress cracking. They can be elastically bent while in a cold condition and installed in this condition. However, in this case, one is limited to large radii of curvature.

Corrugated synthetic resin sheets can be prepared according to German patent No. 1,204,810 from planar material in a thermoelastic condition by tightly clamping the planar sheet on its circumference and heating it, corrugating it by means of two correspondingly corrugated forming dies, and removing the forming dies after the synthetic resin sheet has cooled below the softening point. In the case of a sinusoidal corrugation, a monoaxial stretching of about 20 percent is achieved simultaneously with the deformation. In order to achieve this stretching, particularly strong die presses are necessary. Nevertheless, because of the small degree of stretching, the mechanical properties of the material are not significantly improved in comparison with unstretched material. If one wishes to attain a stretching of 70 percent, for example, the material must first be stretched about 50 percent while in a planar condition and then corrugated in the aforementioned manner using a die press. Since, in this deformation, the forces stemming from the pre-stretching must be overcome, the most extremely strong die press arrangements must be used for the corrugation process. Because of this large technical expenditure, this technique is not employed in practice.

The present intention permits bringing stretched thermoelastically deformable synthetic resin sheets into a bent form without the use of large forces working vertically on the planar sheet. The costly press arrangement thus becomes dispensible. The heart of the invention lies in the idea that the stretched material, for purposes of bending, need only be heated on one side so that the heated surface exceeds the softening temperature and that the softening temperature is not reached on the opposing surface. The softened layer of the sheet in this way becomes thermelastically deformable while the layer which is beneath the softening temperature becomes only bendably elastic. In the warmed layer, the restoring forces stemming from the stretching are released: on the other hand, in the unwarmed layer they remain frozen in. The latter layer prevents the entire sheet from shrinking back under the influence of the released restoring forces to its dimensions prior to stretching. The unwarmed layer has the same effect as a surrounding frame which hinders the contraction of the warmed layer.

The sheet warmed in the manner according to the invention can be bent to the extent that the unwarmed layer can be elastically deformed without breaking. The radius of curvature can, thus, be smaller the thinner is the layer which is not raised above the softening temperature by warming. This layer is bent by cold-elastic forces, and presents a mechanical restoring force opposing the bending. When the bent sheet is cooled beneath the softening temperature, the mechanical restoration force remains. That is, it is not frozen in but is compensated by an equally large mechanical counterforce in the previously-warmed layer. In this way, the cooled sheet retains the bending which it acquired in the warmed condition.

The bent sheet can be deformed in such a way that the warmed surface is optionally convexly or concavely bent. Concave bending takes place by itself as soon as a sufficiently thick layer is warmed above the softening temperature. The released restoring forces effect a contraction of the warmed layer, whereby the latter is concavely bent.

The warmed sheet can, nevertheless, also be bent in a direction opposite to the released restoring forces, whereupon the warmed layer is additionally stretched beyond the original degree of stretching and in this way is concavely bent. For both bending directions, the dimensions of the unwarmed layer remain completely unchanged.

The method of the invention can be carried out with monoaxially stretched material. The bending or corrugation is in this case crosswise to the direction of stretching. Such a material still does not possess all of the advantages of a biaxially stretched material. The latter has a frozen-in force in every surface direction and can be bent or corrugated in any desired surface direction according to the present invention. The warmed zone strives naturally to contract in the longitudinal direction, i.e., in the direction of the corrugation stress. Such a contraction, however, is hindered by the stiffening occasioned by the preceding bending. In order to achieve a defect-free bending or corrugation, the warmed zone must be limited within straight lines and must run to the edges of the sheet.

If the entire sheet is to be bent in the same direction, then it is heated over its entire surface on one side. In most cases, however, a curvature is desired only in limited zones or in abutting zones having opposite directions of curvature (i.e., a corrugated sheet). For this purpose, (a) in the case of a monoaxially stretched material, a region lying crosswise to the direction of stretching and extending over the entire sheet area is heated and deformed in the aforementioned manner, or (b) in the case of a biaxially stretched material, a region extending over the entire sheet area in any desired direction is warmed and curved in the aforementioned fashion.

For carrying out the process, even a small degree of stretching of the order of magnitude of 10 to 20 percent is sufficient. However, significantly improved mechanical properties first become clearly apparent with a degree of stretching of over 50 percent, calculated on the original length of the unstretched material. The preferred material is biaxially stretched from 60 to 80 percent.

For warming the region of the synthetic resin sheet, any method known and suitable for this purpose can be used. Advantageously, contact warming is by means of heated surfaces which are pressed for a certain time against the synthetic resin sheet. Equally advantageous is radiation warming using infrared rays. These bring about a non-uniform warming if they are placed close to the sheet surface. At a sufficiently great distance, the warming is uniform. Nevertheless, it is then suitable to limit the region to be warmed by means of a suitable radiation screen.

The more intensively the heat source works upon the synthetic resin sheet, the higher the surface temperature attained at the conclusion of the heat treatment must be. An intensive heat source will, because of the limited heat conductivity of most synthetic resins, first warm only a thin layer. The heat stored in this layer must be sufficient to warm, by heat conduction, a sufficiently thick layer until it is above the softening temperature. The heat must, however, not be so great that, because of it, the back surface of the material also reaches the softening temperature. The intensity of the heat source and the duration of the heat treatment must therefore be determined empirically in each individual case according to the prevailing conditions. The surface temperature must, after conclusion of the heating treatment, be in the region between the glass temperature and the decomposition temperature. The temperature region which is between 50° and 100° C. above the glass temperature is preferred. The beginning of bending is largely independent of the intensity of the heat source and is, above all, influenced by the physical properties of the synthetic resin, such as its thickness, heat conductivity, and absorption of heat radiation. In the case of working up biaxially stretched acrylic resin sheets 3 mm in thickness, it has proved suitable to heat up the resin surface, using an infrared radiator for a period of between 30 and 60 seconds, to a surface temperature of 150°–250°. Bending in this case takes place about 10 seconds after onset of the heat treatment.

For bending the warmed layer, the released restoring forces are relied upon for the bending process. As long as there is a sufficiently thick portion of the sheet which is still beneath the softening temperature, the sheet heated on one side remains planar. Only if a considerable portion of the core of the sheet is warmed above the softening temperature by heat conduction, do the forces which are released thereby become effective. They bring about a contraction of the warmed surface of the synthetic resin sheet which, however, the opposing unwarmed surface, which is beneath the softening temperature, cannot follow.

The warmed side of the synthetic resin plate thus bends concavely, whereby that portion of the sheet which is still beneath the softening temperature is permanently elastically bent. This portion lying on the convex side of the sheet of the synthetic resin contains, in addition to the frozen-in thermoelastic restoring forces, an additional mechanical restoring force which corresponds to that in a synthetic resin sheet which is bent in a cold condition. Although a restoring shrinkage has occurred on the concave side of the plate, the degree of stretching is not significantly altered in comparison with the original condition, so that the advantageous properties of the stretched material are also present there.

The bending process takes place by itself if the plate is warmed on one side above the necessary surface temperature. Because of the low heat conductivity of most synthetic resins, heat transport from the warmed surface into the core as a rule takes longer than the heating itself, so that the bending first takes place when the plate has already been removed from the heat source. In disadvantageous cases, particularly with very thin or relatively good heat-conducting synthetic resins, it may be desirable to cool that side of the sheet which is not warmed.

The degree of this self-bending depends upon how deeply the heating penetrates into the resin and how quickly the warmed side again cools beneath the softening temperature. Also, the original degree of stretching and other material properties play a role. Because of the very difficultly controllable dependence of numerous influences, it is not advantageous to leave the final form of the bent sheet to a free-forming process. The bendings or corrugations which occur can be brought into an exact, reproducible form with a male or female die, and particularly by using both, without the expenditure of large forces. Naturally, the forming apparatus must essentially correspond with the form evoked by the heat treatment.

The breadth of a region which is bent in a direction can be quite precisely pre-determined by the breadth of the warmed zone. If the warming in this zone takes place very uniformly, bending which is arcuate in cross-section develops. The degree of the naturally-arising bending is determined by the depth of penetration of the warming. This in turn is dependent on the intensity and the duration of the warming influence. Curved cross-sections departing from arcs of circles can be prepared if provision is made for a differential warming across the breadth of a region. For example, if a radiation source placed close to the sheet surface heats the closest lying region more strongly than more distant regions, a bending is evoked which is strongest at the vertex and is shallower at the sides. Such a bending development is suitable, for example, for sinusoidally corrugated synthetic resin sheets. Adjoining regions, curved in the opposite sense, can be bent in differing widths and in differing degrees, so that a cross-section departing from a sinusoidal curve can be prepared. Preferably, the process of the invention is used for the preparation of corrugated panels. For this purpose, adjacent regions of respectively opposing sides of the sheet are warmed so that they curve in an opposing sense. It is suitable to carry out the warming in the different regions on both sides of the sheet simultansously.

In the concave curving of a warmed layer, the degree of stretching on the curved side is decreased. The decrease depends on the original degree of stretching, the thickness of the plate, and on the radius of curvature and can, in the case of a low initial degree of stretching, for large plate thicknesses, or for low bending radii, lead to a complete annulment of the stretching vertical to the bending axis. For very small bending radii and large bending angles, there may even be buckling in the trough of the bend. The zones formed in this manner, which are not stretched, or are only slightly stretched, in one direction, represent a weak point of the shaped body and turn out to be subject to breakage. This disadvantage is avoided, upon convex bending of the warmed layer, by means of an external force. While the released restoring forces on the warmed side of the sheet strive to bring about convex bending, the warmed side is concavely bent by an exterior force opposing the restoring force. In this way, the cold side of the sheet is elastically deformed and the warm side is stretched beyond the original degree of stretching. The formation of zones which are slightly stretched, or not at all stretched, is avoided in this way so that the deformed portions are not endangered by breakage in the edge of the bend.

An external force effecting bending can be brought to bear on the warmed zone with little effort by means of the cold sheet portions which lie on each side of the warmed zone and which work as a lever.

This process is particularly useful for bending radii of less than 20 mm, and particularly of less than 10 mm. In practice, one proceeds by heating a narrow zone of the synthetic resin sheet to be bent on that side which is to be convexly curved and interrupts the influence of heat at the right time before the back side of the sheet reaches the softening temperature. The sheet can then be bent into the desired angle and is then cooled under the softening temperature.

The process of the invention can also be used for the preparation of objects having a corrugated cross-section with large bending radii by uniformly heating the sheet to be corrugated on one side until the softening temperature is reached and subsequently forming the sheet between two matching male and female dies which produce a corrugated cross-section of the desired shape. In a corrugated sheet having a sinusoidal cross-section, then, there is in each half-wave one zone in which the warmed side is concavely bent by the restoring force, alternated with a zone in which the warmed side is convexly bent against the restoring force. To be sure, this method requires greater forming forces than is the case if each half-wave is heated from the side which is to be convexly bent. However, the deforming forces are still always considerably smaller than those necessary for corrugating a pre-stretched sheet.

Stretched acrylic resin is the preferred material for carrying out the process of the invention. The material may be a poured polymethylmethacrylate which, after mono-axial — or, preferably after bi-axial — stretching of, for example, 50–80 percent, has a thickness between 1 and 5 mm. In the same manner, extruded acrylic resin can be employed. The latter can be mono-axially stretched in a simple manner directly after extrusion by cooling the extruded train to a thermoelastic condition by means of a pair of cooling rolls and drawing off the train with a pair of stretching rolls operating at a greater rate of speed than the train is supplied by the cooling rolls. In a corresponding manner, the preparation of a bi-axially stretched extruded material is possible by grasping the edges of the extruded train with a spreading arrangement such as is described, for example, in German Offenlegungsschrift No. 2,056,697, and stretching it in the cross direction.

The resin which is treated can be cross-linked. In addition to acrylic resins, all other synthetic resins which are available in the form of sheets and which enter into a thermoelastic condition at an elevated temperature can be treated. As examples, cellulose acetate or cellulose acetobutyrate, polyvinyl chloride, normal or impact-resistant polystyrene, ABS-resins, polyolefins, and polycarbonates can be mentioned. The thickness of the stretched synthetic resin sheet employed can be between 1 and 10 mm, preferably between 2 and 5 mm. Beneath this region, small bending radii can also be achieved in a cold condition.

Arrangements for carrying out the process of the invention are shown in accompanying FIGS. 1–3, in which.

Figure 1:
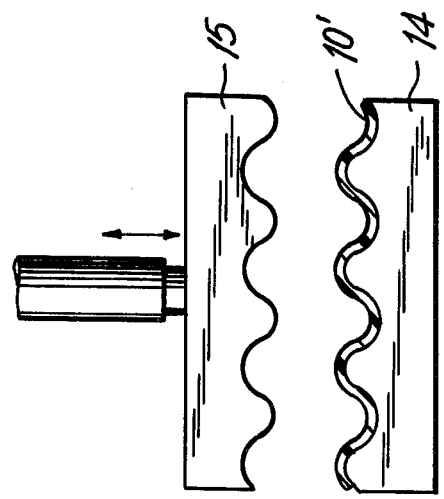
FIG. 1 shows a discontinuously-operating arrangement for performing a concave bending of the warmed side.
Figure 1:
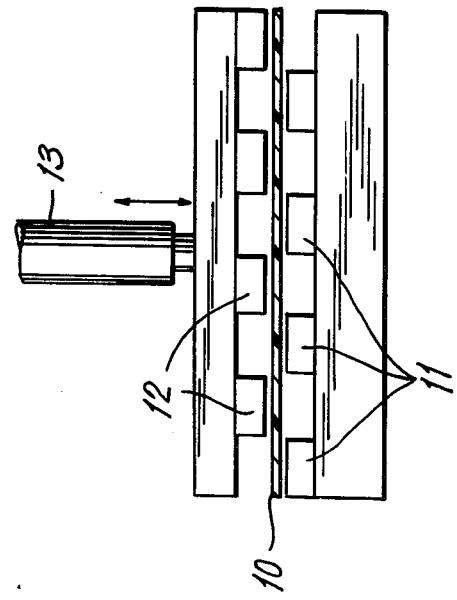

Referring to FIG. 1, corrugated material is suitably prepared discontinuously according to the invention by placing synthetic resin sheet 10 to be treated between two gridworks of displaced heating elements 11, 12 and warming it to whatever temperature is necessary. The upper gridwork is raised above the sheet by means of lifting arrangement 13. Before the beginning of the bending process, the heated sheet is taken from the heating arrangement and placed into forming press 14, 15. The press arrangement 14, 15 is first closed after the bending process has proceeded to a great extent by itself, so that only a very slight closing force is necessary. The press is opened and finished corrugated material 10' is removed when its temperature, on both sides, has fallen beneath the softening temperature.

Extruded and stretched material can be continuously worked into a cross-corrugated train in direct connection with the extrusion and stretching apparatus. The heating and forming arrangement can, in principle, be constructed in the same manner as the previously described discontinuously-operating installation and the continuous resin train can be brought into the desired corrugated form segment-wise. The heating and forming arrangements can be movably mounted on tracks to coordinate the segmental forward movement of the resin train into the corrugating arrangement with the uniform forward movement of the resin train in the extrusion and stretching installation.

Figure 2:
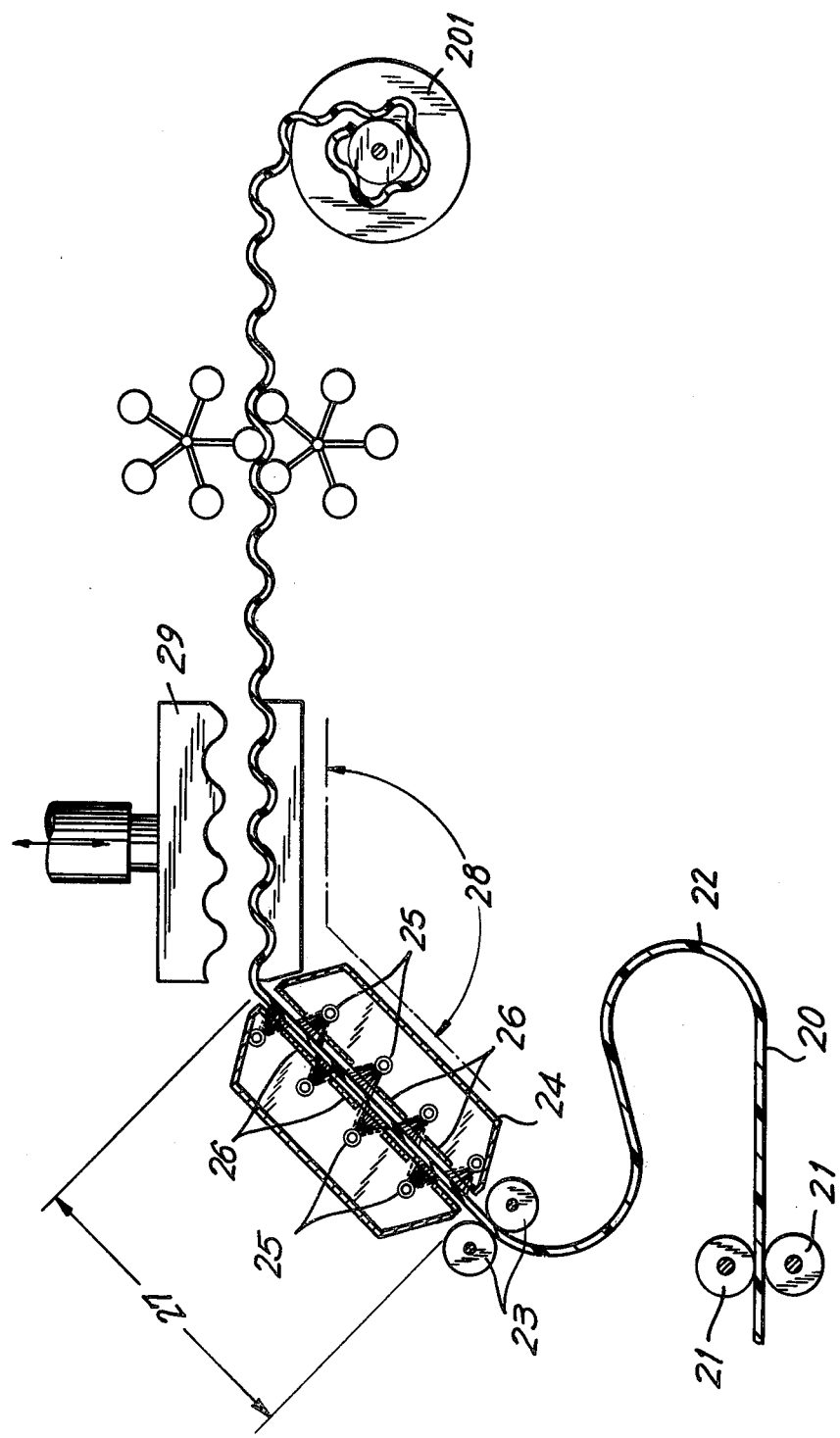
FIG. 2 shows a continuously-operating arrangement for performing a concave bending on the warmed side.

Referring to FIG. 2, it is simpler, however, to permit resin train 20, emerging from stretching apparatus 21, to form reserve loop 22 from which segments of the train can be drawn, by means of periodically operating forward-moving arrangement 23, into heating apparatus 24. The latter contains, on both sides of the resin train, an equal number of intermittently-arranged heating elements 25 and, optionally, radiation shields 26, which are arranged along that length 27 of the train which is periodically moved forward in segments and which extend across the entire breadth of the train. For the preparation of sinusoidally corrugated material, the path of the train through heating zone 24 is arranged at obtuse angle 28 to the path of the train through forming zone 29. This obtuse angle 28 corresponds with the angle of intersection of the sinusoid with the intended medial plane of the corrugated train. The finished train can be cut into pieces of the desired length by cutting apparatus or, because of the high elasticity of the stretched material, may be rolled up 201. The rhythmic operation of the corrugation apparatus must be adjusted to the rate of forward movement of the extrusion and stretching apparatus. For this reason, a portion of the train drawn into the heating zone is first warmed only after sufficient material has flowed into reserve loop 22 to permit further feeding of the warmed material before beginning bending in the forming zone. At the same time, a new segment is fed into the heating zone.

Figure 3:
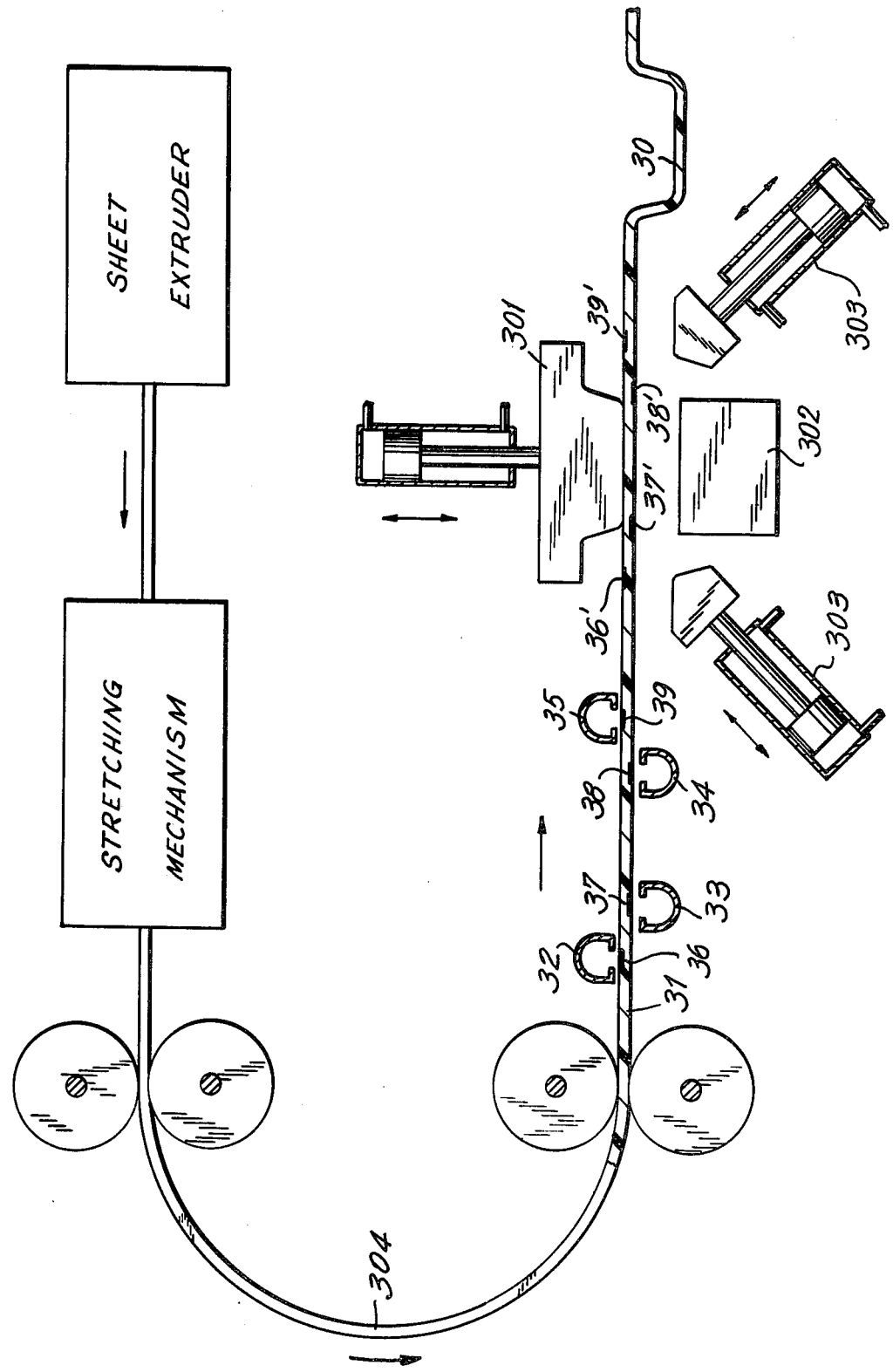
FIG. 3 shows an arrangement with which the warmed side of a sheet may be convexly curved.

Referring to FIG. 3, for the preparation of material 30 having a trapezoidal cross-section with sharp angles, it is, for the reasons described earlier, more advantageous to carry out the process with a convex curving of the warmed side. For this purpose, planar sheet 31 is warmed with heating elements 32, 33, 34, 35 in corresponding narrow zones 36, 37, 38, 39, then put into the desired cross-sectional form by means of forming tool 301, 302, 303, and then cooled beneath the softening temperature. This process can be carried out stepwise on a continuously-moving stretched sheet by, in each step, warming four zones and then deforming after moving the sheet in the direction of the arrow by one wavelength (position 36', 37', 38', 39'). Such a quasi-continuously operating deformation apparatus can be connected with a sheet extruder and a stretching mechanism if, by means of reserve loop 304, means for transforming the uniform forward movement of the sheet into a stepwise movement are provided.

The process of the invention can be employed to make shaped bodies of the most different forms by angular bending of stretched synthetic resin sheets. Preferably, the process is used for the preparation of corrugated sheets and strips which find manifold uses in construction as roofing materials, skylights, papapets for balconies, and the like.

What is claimed is:

1. A method for bending a biaxially-stretched sheet of a thermoelastically deformable synthetic resin, which method comprises heating one side of said sheet in a first plurality of regions thereof and the other side of said sheet in a second plurality of regions different from said first plurality of regions, said regions extending across the entire breadth of the sheet and members of said first and second pluralities being adjacent and alternating, such that the softening temperature of the resin is exceeded on the heated side of the sheet and is not exceeded on the opposing side, and then bending the sheet in the heated portions with forming means and cooling the bent sheet, whereby a substantially sinusoidally-corrugated sheet is formed on bending.

2. A method as in claim 1 wherein the heated side of said sheet is concavely bent.

3. A method for bending a biaxially-stretched sheet of a thermoelastically deformable synthetic resin, which method comprises heating one side of said sheet in a first plurality of regions thereof and the other side of said sheet in a second plurality of regions different from said first plurality of regions, said regions extending across the entire breadth of the sheet and a pair of neighboring members of said second plurality of regions being separated from each other by an unheated region on the same side of the sheet and a pair of neighboring members of said first plurality of regions being separated from each other by an unheated region on the same side of the sheet and by a pair of neighboring members of said second plurality of regions on the opposing side of the sheet, such that the softening temperature of the resin is exceeded on the heated side of the sheet and is not exceeded on the opposing side, and then bending the sheet in the heated portions with forming means and cooling the bent sheet, whereby a substantially trapezoidally-corrugated sheet is formed on bending.

4. A method as in claim 3 wherein the heated side of said sheet is convexly bent.

* * * * *